Sept. 15, 1959  M. C. MacIVER  2,904,378
ADJUSTABLE AND COLLAPSIBLE DESK FOR MOTOR VEHICLES
Filed Sept. 29, 1958  3 Sheets-Sheet 3
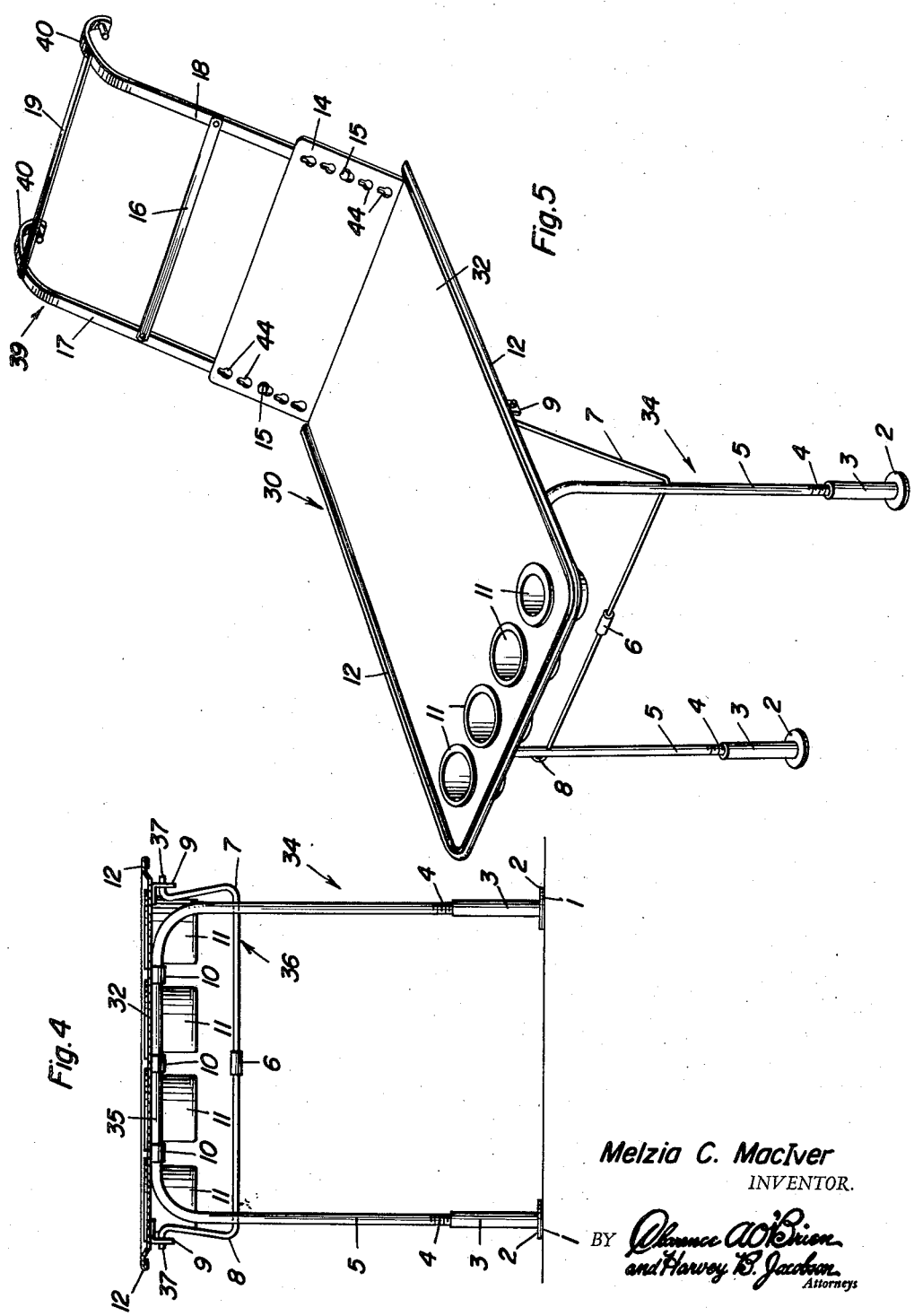
Melzia C. MacIver
INVENTOR.

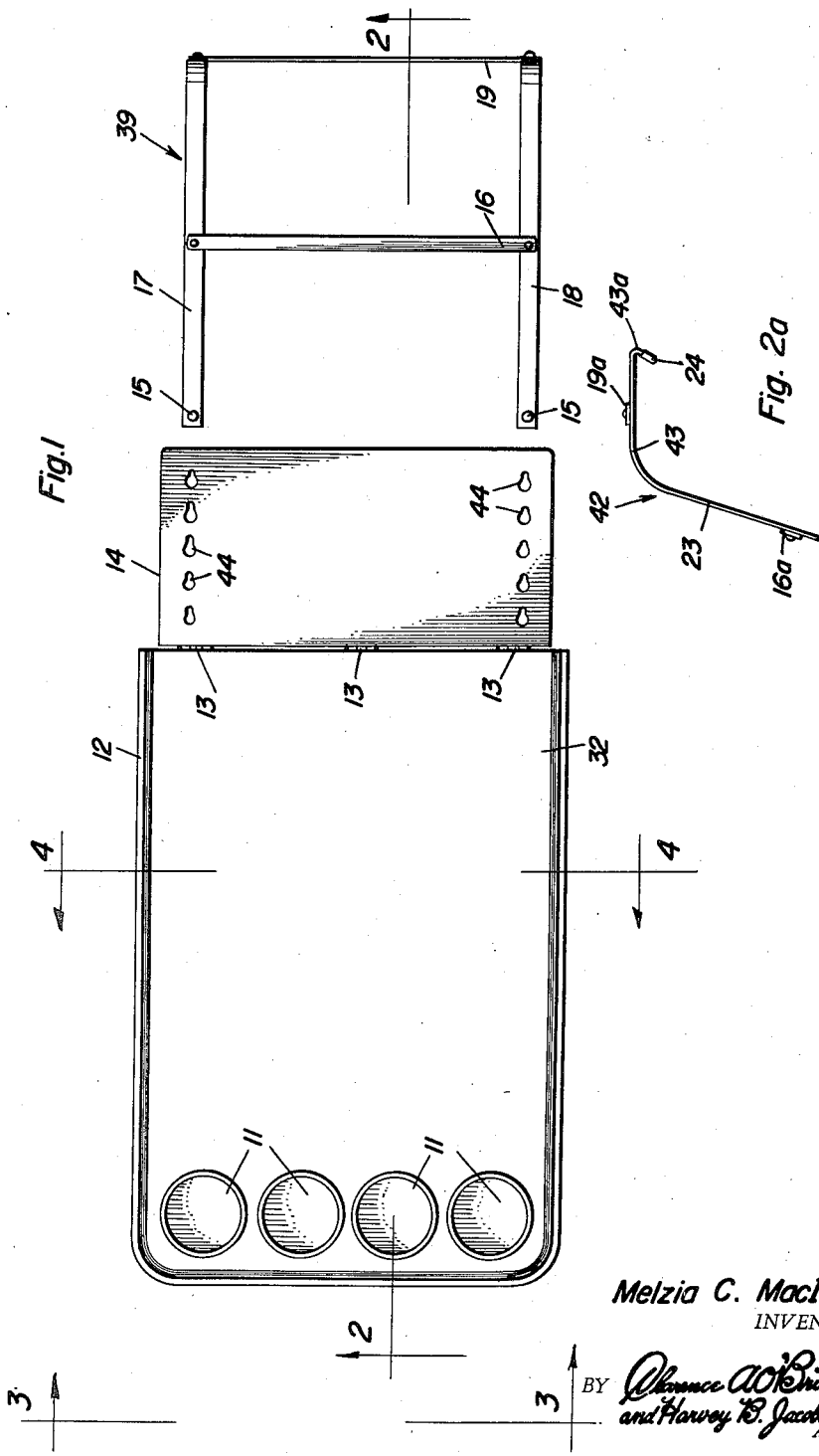

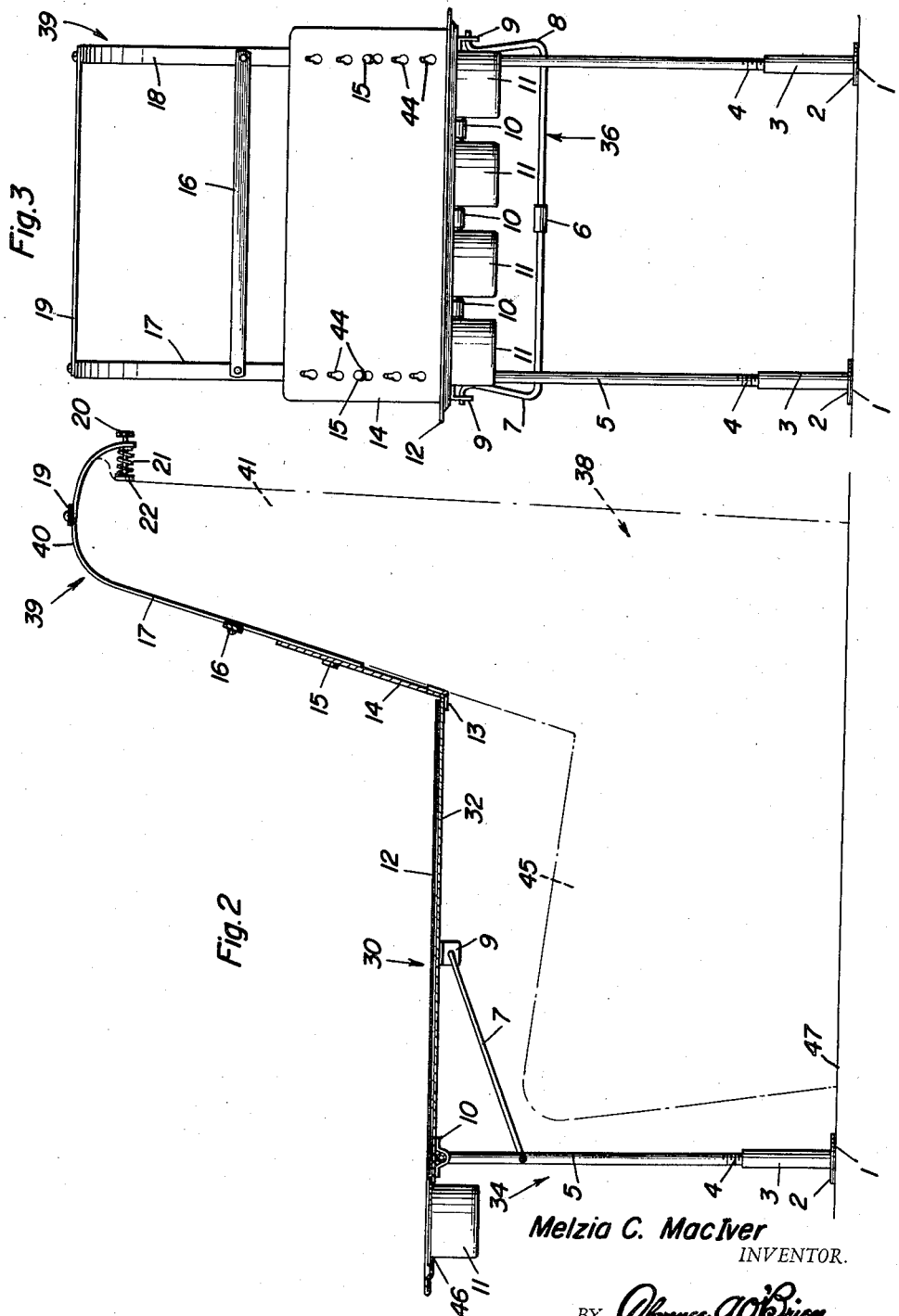

United States Patent Office 2,904,378
Patented Sept. 15, 1959

2,904,378

ADJUSTABLE AND COLLAPSIBLE DESK FOR MOTOR VEHICLES

Melzia C. MacIver, Dallas, Tex.

Application September 29, 1958, Serial No. 764,174

1 Claim. (Cl. 311—21)

This invention relates in general to new and useful improvements in accessories for vehicles, and more specifically to an improved desk for vehicles.

Although there has been devised many types of accessories for vehicles, including desks, all of the desks have been of such a relation to the vehicle whereby use thereof is difficult. It is therefore the primary object of this invention to provide a desk for vehicles, the desk being of such a construction whereby it may be readily mounted in a vehicle and in a position where it may be readily used by one seated in the vehicle.

A further object of this invention is to provide an improved desk attachment for vehicles, the desk attachment being of such a nature whereby it may be positioned over a vehicle seat, the desk attachment being of such a construction whereby it may be partially disassembled and folded for convenience of storage so that it may be carried in the trunk of the vehicle when not in use and occupying a relatively small space therein.

Another object of this invention is to provide a car desk attachment for vehicles, the attachment being so constructed whereby it is readily adjustable and adaptable to all makes of vehicles.

A still further object of this invention is to provide an improved desk attachment for vehicles, the desk attachment including a seat forming the desk surface, there being pivotally connected to the forward edge of the sheet a depending leg unit, and there being connected to the rear portion of the sheet a hanger assembly, which hanger assembly readily adjusts to the contour of the seat back and is so engaged with the seat back whereby the attachment is anchored as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the car desk which is the subject of this invention and shows the general outline of the car desk, the hanger assembly and back rest of the car desk being in horizontal positions with the hanger assembly being disconnected from the backrest;

Figure 2 is a longitudinal sectional view taken substantially upon the plane indicated by the section line 2—2 of Figure 1 and shows the car desk in its assembled state and positioned on a vehicle seat, the vehicle seat being shown in phantom lines;

Figure 2a is a fragmentary sectional view showing the details of the upper portion of a modified form of hanger assembly;

Figure 3 is a front elevational view of the car desk in its assembled form taken substantially along the line 3—3 of Figure 1 and shows further details of the car desk;

Figure 4 is a transverse sectional view taken substantially upon the plane indicated by the section line 4—4 of Figure 1 and shows the details of the leg unit and the manner in which it is hingedly connected to the sheet which defines the car desk surface; and Figure 5 is an isometric view of the car desk.

Referring now to the drawings in detail, it will be seen that there are illustrated the details of the car desk which is the subject of this invention, the car desk being referred to in general by the reference numeral 30. The car desk 30 includes a generally flat sheet 32 which is preferably formed of metal and which is provided about the two sides and front edges thereof with an upstanding border flange 12.

In order to facilitate the supporting of the sheet 32, there is provided a leg unit which is referred to in general by the reference numeral 34 and which is best illustrated in Figure 4. The leg unit 34 is of an inverted U-shape and includes a horizontal cross bar 35 to which there is integrally connected in depending relation a pair of legs 5. The legs 5 have externally threaded lower portions 4 which are threadedly engaged in tubular extensions 3. The tubular extensions 3 terminate in base plates 2 which have the undersurface thereof covered by a suitable pad 1. Thus the base plate 2 may be seated on the floor of the vehicle without marring the floor. By varying the positions of the tubular extensions 3 with respect to the legs 5, the leg unit 34 may be readily adapted to any type of vehicle.

The cross bar 35 is pivotally connected to the underside of the sheet 32 by means of a plurality of retaining sleeves 10 which are disposed in transverse alignment and which are suitably secured to the underside of the sheet 32. This permits the leg unit 34 to be swung upwardly under the sheet 32 into a stored position.

In order that the leg unit 34 may be retained in a vertical position, there is provided a brace assembly which is referred to in general by the reference numeral 36. The brace assembly 36 includes a pair of individual brace members 7 and 8 which are passed through the upper portions of the legs 5 and which are connected together by connectors 6 intermediate the legs 5. The brace members 7 and 8 extend rearwardly and upwardly from the legs 5, as is best illustrated in Figure 2 and terminate in offset end portions 37 which are releasably received in clips 9 secured to the underside of the sheet 32 adjacent the side edges thereof.

In order to facilitate the hanging of the rear portion of the sheet 32 from a car seat, such as the car seat 38, there is provided a hanger assembly which is referred to in general by the reference numeral 39. The hanger assembly 39 is formed of a pair of elongated straps 17 and 18 which terminate in upper hook portions 40. The straps 17 and 18 are connected together adjacent the lower ends by transverse straps 16. The upper portions of the straps 17 and 18 are connected together by a transverse strap 19.

The hook portion 40 of the hanger assembly 39 is so designed whereby it will engage over the upper part of the back 41 of the seat 38. In certain models of vehicles, the upper rear part of the back 41 project rearwardly as at 42. In order to facilitate engagement with said seats, the straps 17 and 18 terminate at their upper rear ends in fasteners 20 which pass therethrough and which are provided at their forward ends with pads 22, such pads being preferably formed of neoprene or similar material. The fasteners 20 are spring loaded by means of springs 21 so as to constantly urge them to the left, as viewed in Figure 2, to hold the hanger assembly 39 in place on the seat back 41.

Referring now to Figure 2a in particular, it will be seen that there is illustrated a modified form of hanger assembly which is referred to in general by the reference numeral 42. The hanger assembly 42 is formed of a pair of straps 23 whose lower portions are similar to the straps 17 and 18 and whose upper portions are in the form of a hook 43. However, the hook 43 is flatter than the hook 40 whereby the hanger assembly 42 is adapted to be engaged over a different form of seat back than the seat back 41. The upper ends of the straps 23 terminate in downwardly and forwardly projecting portions 43a over which there are engaged pads 24 to prevent damaging of the seat back. The straps 23 have their lower portions connected together by a transverse strap 16a. The upper portions of the straps 23 are connected together by a transverse strap 19a. Otherwise, the hanger assembly 42 is identical in function and structure to the hanger assembly 39.

Disposed in transversely spaced relation along the underside of the sheet 32 at the rear edge thereof is a plurality of hinges 13. The hinges 13 serve to secure to the sheet 32 a backrest 14 which is in the form of a flat plate. The backrest 14 has formed therein along opposite side edges thereof rows of keyhole slots 44. The keyhole slots 44 have selectively engaged therein headed pins 15 which are carried by the lower parts of the straps 17 and 18. Because the backrest 14 is provided with a plurality of the keyhole slots 44, the hanger assembly 39 may be adjusted relative to the backrest 14. This permits adjustment of the elevation of the sheet 32 so that it is disposed the desired distance above the cushion portion 45 of the car seat 38.

Carried by the forward part of the sheet 32 forwardly of the leg unit 34 is a plurality of receptacles 11. The receptacles 11 are passed through suitable openings 46 formed in the sheet 32 and are suitably secured to the sheet 32.

When it is desired to mount the car desk 30 in a vehicle over a front seat thereof, such as the seat 38, the hanger assembly 39 is engaged over the seat back in the position illustrated in Figure 2. On the other hand, when the car desk 30 is to be mounted in a rear seat, the hanger assembly 42 is used. Then the backrest 14 is engaged with the fasteners 15 to position the rear at this time the leg unit 34 is in engagement with the floor 47 of the vehicle. The sheet 32 is then leveled by turning the extension 3 relative to the legs 4 so as to extend or shorten the legs 5. It is to be understood that once the car desk 30 has been set up for the particular vehicle seat, no further adjustment will be necessary. When the car desk 30 is stored, it is merely necessary to disengage the braces 7 and 8 and to disengage the hanger assembly 39. The car desk 30 may then be folded for ready storage in the trunk of the vehicle. The car desk having been once adjusted, it is merely necessary to remove the components thereof from the trunk of the vehicle and assemble them.

The receptacles 11 may be used for any desired purpose. If it is desired, they may be used for the purpose of supporting paper clips and the like. On the other hand, they may support glasses, drink bottles or baby milk bottles.

The uses of the car desk 30 are numerous. When on a business trip it may be used as a desk. On the other hand, when travelling or during inclement weather at picnics, it may be used as a table. Also, it may be used for the playing of cards and the like. Other uses of the car desk 30 will become apparent once it is installed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A desk for mounting within a motor vehicle, said desk comprising an essentially flat sheet constituting a desk top, said sheet having a forward edge and a rear edge together with side edges, a leg unit having a pair of legs with lower ends of a length to rest on the vehicle floor and a crossbar connected to the upper ends of said legs, a retaining sleeve secured to the bottom of said flat sheet at a position rearwardly of said forward edge of said sheet and forwardly of the rear edge of said sheet but located closer to said forward edge than said rear edge thereby leaving a forward portion of said flat sheet overhanging forwardly of said leg unit, leg braces connected with said legs and said sheet between said rear edge and the crossbar of said leg unit, a desk back rest hinged to the rear edge of said flat sheet, said back rest being movable between positions at which it is approximately parallel to said sheet and a generally upstanding position with respect to said sheet so that the back rest may be adjusted to fit the angularity of the vehicle seat back relative to the vehicle seat, a pair of hanger straps having curved upper ends to fit over the upper edge of the vehicle back rest, means securing said hanger straps to said desk back rest for lengthwise adjustment of said hanger straps relative to said desk back rest, said legs having a lengthwise adjusting structure to adjust the effective lengths of the legs, fasteners at the extremities of said curved upper ends of said straps to engage the back of the vehicle back rest and separably fasten said hanger straps onto the vehicle back rest, and an article retainer carried by said sheet at the forward end thereof between said crossbar and said forward edge of said flat sheet.

References Cited in the file of this patent

UNITED STATES PATENTS

| | | |
|---|---|---|
| 534,686 | Falk | Feb. 26, 1895 |
| 797,451 | McBryde | Aug. 18, 1905 |
| 2,399,792 | Copp | May 7, 1946 |
| 2,460,712 | Peterson | Feb. 1, 1949 |
| 2,556,724 | Hubsch | June 12, 1951 |
| 2,601,177 | Smullen | June 17, 1952 |
| 2,684,276 | Bailey | July 20, 1954 |
| 2,741,521 | Bell et al. | Apr. 10, 1956 |
| 2,763,378 | Black | Sept. 18, 1956 |